United States Patent
Villien

(10) Patent No.: US 10,175,777 B2
(45) Date of Patent: Jan. 8, 2019

(54) METHOD AND APPARATUS FOR DETECTING A MANIPULATION OF A PORTABLE DEVICE

(71) Applicants: COMMISSARIAT A L'ENERGIE ATOMIQUE ET AUX ENERGIES ALTERNATIVES, Paris (FR); MOVEA, Grenoble (FR)

(72) Inventor: Christophe Villien, Seyssinet-Pariset (FR)

(73) Assignees: Commissariat a l'energy Atomique et Aux Energies Alternatives, Paris (FR); Movea, Grenoble (FR)

( * ) Notice: Subject to any disclaimer, the term of this patent is extended or adjusted under 35 U.S.C. 154(b) by 0 days.

(21) Appl. No.: 15/106,772

(22) PCT Filed: Dec. 23, 2014

(86) PCT No.: PCT/EP2014/079225
§ 371 (c)(1),
(2) Date: Jun. 20, 2016

(87) PCT Pub. No.: WO2015/101568
PCT Pub. Date: Jul. 9, 2015

(65) Prior Publication Data
US 2017/0003721 A1    Jan. 5, 2017

(30) Foreign Application Priority Data

Dec. 31, 2013 (FR) ..................................... 13 63729

(51) Int. Cl.
G06F 3/0346 (2013.01)
G06F 3/01 (2006.01)
G06F 1/32 (2006.01)

(52) U.S. Cl.
CPC .......... *G06F 3/0346* (2013.01); *G06F 1/3206* (2013.01); *G06F 3/017* (2013.01); *G06F 2200/1637* (2013.01)

(58) Field of Classification Search
CPC .................................................. G06F 3/0346
See application file for complete search history.

(56) References Cited

U.S. PATENT DOCUMENTS 9,001,047 B2 * 4/2015 Forstall ................. G06F 1/1626
345/156
9,239,916 B1 * 1/2016 Bailey ..................... G06F 21/36
9,310,972 B2 * 4/2016 Lee ........................ G06F 1/1694
(Continued)

*Primary Examiner* — Patrick F Marinelli
(74) *Attorney, Agent, or Firm* — Baker & Hostetler LLP

(57) ABSTRACT

A method for detecting a manipulation of a mobile device, comprises the following steps: a) determining, by means of a sensor, the orientation of the vertical direction in a reference frame tied to the mobile device at a plurality of successive instants; b) calculating, for each instant, the angle formed by the orientation of the vertical direction in the reference frame and a reference orientation, and c) detecting a manipulation when the angle exceeds a first threshold. An apparatus for detecting a manipulation of a mobile device comprises: a sensor for measuring the orientation of a vertical direction in a reference frame tied to the mobile device, and a processor connected to the sensor configured or programmed to implement such a method. A mobile phone comprising such an apparatus is also provided.

16 Claims, 3 Drawing Sheets

(56) References Cited

U.S. PATENT DOCUMENTS

| | | | |
|---|---|---|---|
| 9,459,276 B2* | 10/2016 | Joseph | G01P 21/00 |
| 9,575,646 B2* | 2/2017 | Forstall | G06F 1/1626 |
| 2005/0064911 A1* | 3/2005 | Chen | G06F 1/1616 |
| | | | 455/566 |
| 2005/0212758 A1* | 9/2005 | Marvit | G06F 1/1613 |
| | | | 345/156 |
| 2006/0017692 A1* | 1/2006 | Wehrenberg | G06F 1/1616 |
| | | | 345/156 |
| 2006/0176278 A1* | 8/2006 | Mathews | G09G 3/20 |
| | | | 345/168 |
| 2007/0004451 A1* | 1/2007 | Anderson | G06F 1/1626 |
| | | | 455/556.1 |
| 2007/0115277 A1* | 5/2007 | Wang | A61B 5/1116 |
| | | | 345/419 |
| 2007/0208544 A1* | 9/2007 | Kulach | A61B 5/112 |
| | | | 702/189 |
| 2008/0059888 A1* | 3/2008 | Dunko | G06F 1/1613 |
| | | | 715/744 |
| 2008/0165152 A1* | 7/2008 | Forstall | G06F 1/1626 |
| | | | 345/173 |
| 2008/0234935 A1 | 9/2008 | Wolf et al. | |
| 2009/0265671 A1 | 10/2009 | Sachs et al. | |
| 2009/0303204 A1 | 12/2009 | Nasiri et al. | |
| 2011/0054922 A1* | 3/2011 | Gaines | G06Q 30/02 |
| | | | 705/1.1 |
| 2012/0004923 A2* | 1/2012 | Gaines | G06Q 30/02 |
| | | | 705/1.1 |
| 2012/0056801 A1 | 3/2012 | Bevilacqua et al. | |
| 2012/0116710 A1 | 5/2012 | Fujiwara | |
| 2012/0188154 A1* | 7/2012 | Lee | G06F 1/1694 |
| | | | 345/156 |
| 2013/0069988 A1* | 3/2013 | Kamei | G06F 1/1637 |
| | | | 345/658 |
| 2013/0174636 A1* | 7/2013 | Joseph | G01P 21/00 |
| | | | 73/1.41 |
| 2013/0257582 A1* | 10/2013 | Rothkopf | G06F 1/1656 |
| | | | 340/3.1 |
| 2014/0320536 A1* | 10/2014 | Mok | G06T 3/60 |
| | | | 345/659 |
| 2015/0022434 A1* | 1/2015 | Matas | G06F 1/1694 |
| | | | 345/156 |
| 2015/0145893 A1* | 5/2015 | Forstall | G06F 1/1626 |
| | | | 345/650 |
| 2015/0205366 A1* | 7/2015 | Petersen | G06Q 30/00 |
| | | | 345/156 |
| 2016/0093015 A1* | 3/2016 | Li | G06F 3/1454 |
| | | | 345/672 |
| 2017/0003140 A1* | 1/2017 | Villien | G01C 21/14 |
| 2017/0003721 A1* | 1/2017 | Villien | G06F 1/3206 |
| 2017/0010693 A1* | 1/2017 | Wehrenberg | G06F 1/1616 |
| 2018/0059770 A1* | 3/2018 | Kingma | G01P 13/00 |

* cited by examiner

METHOD AND APPARATUS FOR DETECTING A MANIPULATION OF A PORTABLE DEVICE

CROSS-REFERENCE TO RELATED APPLICATIONS

This application is a National Stage of International patent application PCT/EP2014/079225, filed on Dec. 23, 2014, which claims priority to foreign French patent application No. FR 1363729, filed on Dec. 31, 2013, the disclosures of which are incorporated by reference in their entirety.

FIELD OF THE INVENTION

The invention relates to a method and to an apparatus for detecting a manipulation of a mobile device, such as a mobile phone (in particular of smartphone type) or a touchscreen tablet. The invention also relates to a mobile phone or touchscreen tablet integrating such an apparatus.

The term "manipulation" is understood to mean an intentional movement of the device caused by its user, e.g. when it is taken out of a pocket or handbag, brought to his or her face in order to make a phone call, passed to another person, etc.

BACKGROUND

It is sometimes necessary for a mobile device to be able to autonomously determine when it is being manipulated. For example, the detection of a manipulation may allow a mobile phone to increase the brightness of its screen— previously kept at a low level for the sake of saving energy—in order to facilitate unlocking. At present, this is not carried out automatically and requires a specific operation on the part of the user (generally, a touch on the screen).

The use of an accelerometer or a magnetometer allows the movements of a mobile device to be detected, which may be attributed to a manipulation. However, these movements may also be caused by the movements of the user carrying the device and thereby lead to "false positives". The invention aims to provide a method and an apparatus for detecting a manipulation of a mobile device (other than a simple translational movement, which occurs for example during a journey) that minimizes the risk of false positives while having a satisfactory detection rate.

The inventor has realized that false positives are essentially due to movements of the mobile device that are induced by the user's walking. These movements essentially consist of low amplitude oscillations at a frequency of the order of 1 Hz that are caused by footsteps and, occasionally, of high amplitude rotations around a vertical axis, caused by changes of course. In contrast, an intentional manipulation most frequently comprises a rotation of rather high amplitude around an axis which is generally not vertical, potentially followed by rotations of lower amplitude. The method and the apparatus of the invention take advantage of these differences in order to distinguish between intentional manipulations of the device and spurious movements resulting, in particular, from the user's walking. According to the invention, rotations only around the vertical axis are not detected as manipulations, as they are generally simple changes of course as part of the user's navigation.

SUMMARY OF THE INVENTION

A first subject of the invention is a method for detecting a manipulation of a mobile device, comprising the following steps:

a) determining, by means of a sensor fixed to said mobile device, the orientation of the vertical direction in a reference frame tied to said mobile device at a plurality of successive instants;

b) calculating, for each said instant, the angle formed by the orientation of said vertical direction in said reference frame at this instant (current vertical) and a reference orientation corresponding to the vertical direction at a prior instant, and c) detecting a manipulation when said angle exceeds a first threshold.

Advantageously, such a method may also comprise the following step:

d) subsequent to the detection of a manipulation, considering, for a determined duration, that it is in progress.

Additionally, said step c) may advantageously also comprise the following step:

c') also detecting a manipulation when said angle exceeds a second threshold that is lower than said first threshold, a manipulation already being considered to be in progress.

Advantageously, such a method may also comprise the following step:

e) when a manipulation is detected at an instant referred to as an instant of detection, the orientation of said vertical direction at said instant of detection, or at a prior instant, is taken as a new reference orientation.

Alternatively, said reference orientation may be chosen so as to be equal to the orientation of said vertical direction at a prior instant that precedes a current instant by a duration $\tau$ of between 0.5 and 5 seconds.

According to other advantageous features, taken separately or in combination:

said sensor may be a three-axis accelerometer;

said step a) may also comprise an operation of low-pass filtering a signal generated by said sensor, advantageously implemented with a cutoff frequency that is lower than or equal to 1 Hz and preferably lower than or equal to 0.5 Hz;

the instants of one said succession may be spaced apart by a mean interval of between 1 second and 1 millisecond;

said first threshold may be between 15° and 45°, and preferably between 20° and 40°;

said second threshold may be between 5° and 25°;

said determined duration may be between 0.1 and 2 seconds;

said mobile device may be chosen from between a mobile phone and a touchscreen tablet.

A second subject of the invention is an apparatus for detecting a manipulation of a mobile device, comprising:

a sensor for measuring the orientation of a vertical direction in a reference frame tied to said mobile device, and a processor connected to said sensor, said processor being configured or programmed to implement a method as claimed in one of the preceding claims.

A third subject of the invention is a mobile phone comprising such an apparatus.

A fourth subject of the invention is a touchscreen tablet comprising such an apparatus.

BRIEF DESCRIPTION OF THE DRAWINGS

Other features, details and advantages of the invention will become apparent upon reading the description made with reference to the appended drawings that are given by way of example and which show, respectively.

DETAILED DESCRIPTION

As mentioned above, the manipulations that are desired to be detected here do not comprise simple translational movements of the device (journey by the user), nor simple rotations around a vertical axis (change of course during the journey). However, combined movements (simple translational movement combined with a rotation around an axis that is distinct from the vertical axis, simultaneous rotations around multiple axes, etc.) are detected by the apparatus and the method of the invention.

Figure 1:
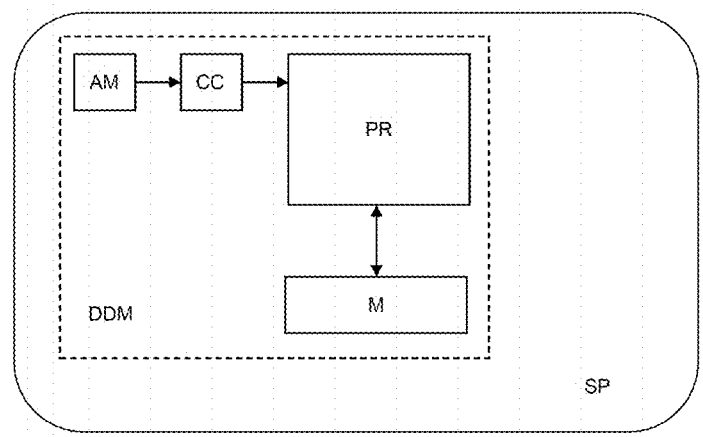
FIG. 1, a functional diagram of an apparatus according to one embodiment of the invention, integrated in a mobile phone.

FIG. 1 diagrammatically shows a mobile phone of smartphone type SP, integrating an apparatus for detecting manipulations DDM according to one embodiment of the invention. The latter comprises a MEMS (microelectromechanical systems) technology three-axis accelerometer AM, a circuit CC for conditioning (filtering, sampling and converting to digital format) the signals generated by said accelerometer, a processor PR that receives the signals thus conditioned, and a memory M that stores a program executed by said processor in order to implement a method according to the invention. It should be noted that these various elements are normally present in smartphones, as well as in other devices such as touchscreen tablets. Thus, purely software-based modifications may suffice to transform a smartphone or a touchscreen tablet into a mobile device according to the prior art that is capable of implementing the invention.

Figure 2A:
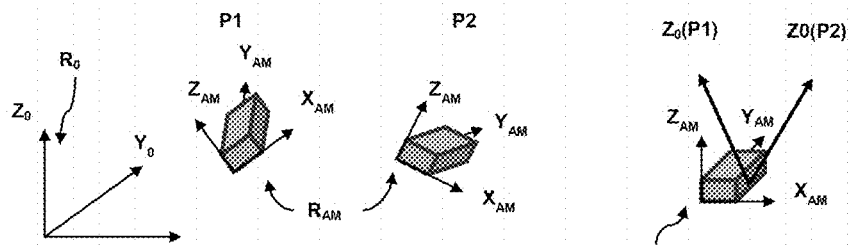
FIGS. 2A and 2B, measurement of the orientation of the vertical direction in a reference frame tied to the mobile device whose manipulations are to be detected, and FIG. 3, a flowchart of a method according to a first embodiment of the invention where the reference is taken at the current instant.

FIG. 2A shows the orientation of the accelerometer AM in an inertial reference frame $R_0$ (axes $X_0$, $Y_0$, $Z_0$, the latter corresponding to the local vertical) for two positions P1 and P2 of the mobile device. The figure also shows, in both positions, a reference frame $R_{AM}$ (axes $X_{AM}$, $Y_{AM}$, $Z_{AM}$) that is tied to the accelerometer, and hence moving in the inertial reference frame. Assuming that the mobile device is not subject to violent accelerations, the accelerometer AM essentially measures the gravitational acceleration, directed along the axis $Z_0$; in any case, the gravitational acceleration is dominant if only the low frequency components (1 Hz or lower) of the signals that it provides are considered. More specifically, regardless of its position, the accelerometer AM provides signals that are representative of the orientation (i.e. of the components) of the axis $Z_0$ in its own reference frame $R_{AM}$.

Figure 2B:
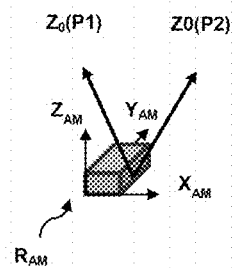

FIG. 2B shows the accelerometer AM in its own reference frame $R_{AM}$. In this reference frame, the transition of the device from position P1 to position P2 translates into a change in the orientation of $Z_0$, i.e. of the vertical direction.

According to the invention, a change in the orientation of $Z_0$ with respect to a reference or "initial" orientation, and exceeding a certain threshold s1, is considered to be indicative of a manipulation of the device. The threshold s1 makes it possible not to take into account the small oscillations caused by the user's walking; the fact of being concerned with changes in the orientation of $Z_0$ allows the effect of changes of course by users, which do not alter this orientation (they are precisely rotations around the vertical axis $Z_0$), to be ignored. The threshold s1 is advantageously between 15° and 45°, and preferably between 20° and 40°; for example, it may be 30°.

Figure 3:
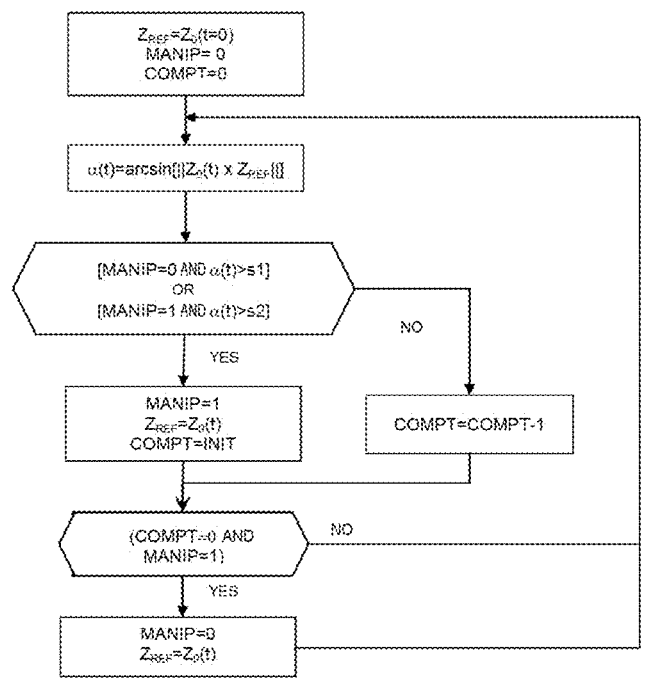

The flowchart of FIG. 3 illustrates, in more detail, the implementation of a method according to one embodiment of the invention. Although not shown, it is assumed that the signals from the accelerometer AM are subjected to low-pass filtering with a cutoff frequency that is lower than or equal to 1 Hz, and preferably lower than or equal to 0.5 Hz, thereby allowing the influences of oscillations due to walking and potential impacts to be minimized. Additionally, these signals are sampled—or sub-sampled—at a frequency that is typically of the order of 200 Hz, but may be higher (1 kHz or more) or lower (5-10 Hz or less). This sampling frequency may be variable; more generally, the orientation of $Z_0$ is considered at instants spaced apart by a mean interval of between 1 second and 1 millisecond.

First, the orientation of the axis $Z_0$ at instant t=0 is taken as the initial, or reference, orientation $Z_{REF}$. Additionally, it is assumed that no manipulation is in progress at instant t=0; therefore the "flag" (binary variable) MANIP is set as equal to zero. Furthermore, a counter COMPT is set to zero.

Next, at each instant "t", the angle $\alpha(t)$ between the orientation of $Z_0$ in the reference frame $R_{AM}$ and the orientation of $Z_{REF}$, considered to be fixed in this reference frame, is determined. This angle may be determined by calculating the arcsine of the norm of the vector product of $Z_{REF}$ and $Z_0$, for which the accelerometer AM provides the components along the axes $X_{AM}$, $Y_{AM}$ and $Z_{AM}$ (it is assumed that $\|Z_0\|^2=\|Z_{REF}\|^2=1$, which may be obtained by normalization):

$$\alpha(t)=\arcsin(\|Z_{REF}\times Z_0(t)\|)$$

Next, the detection of manipulations is carried out. A manipulation is detected if:
when the flag MANIP is equal to 0, $\alpha(t)\geq s1$; or if
when the flag MANIP is equal to 1, $\alpha(t)\geq s2$, where s2 is a second threshold that is lower than s1 and may be, for example, between 5° and 25°.

The idea is that a manipulation often starts with a substantial change in orientation, then continues with smaller changes in orientation.

If a manipulation is detected (whether it is an "initial detection", where the first threshold s1 is crossed, or a "subsequent detection", where the second threshold s2 is crossed):
  the flag MANIP changes to 1, to indicate that a manipulation is in progress;
  the reference direction $Z_{REF}$ is updated, and takes the value of $Z_0$ at the instant of detection, $Z_0(t)$;
  the counter COMPT takes a predefined value INIT that corresponds to a predetermined duration, generally of the order of 1 second.

If no manipulation is detected, the counter COMPT is decremented by one unit (assuming that it is not zero).

It is noted that according to this embodiment, the reference direction is updated to the value of $Z_0$ at the instant of detection "t", and this happens when a manipulation is detected (MANIP=1), or at the end of a manipulation (MANIP goes from 1 to 0).

In the absence of the detection of a manipulation (MANIP=0), the reference value is not updated.

When the counter COMPT takes the value zero, the flag MANIP is reset to zero, otherwise it keeps its value. In any case, the method is iteratively repeated. The use of the counter is based on the following principle: once a manipulation has been detected (whether it is an "initial detection", where the first threshold s1 is crossed, or a "subsequent detection", where the second threshold s2 is crossed), it is regarded as being continued for at least a predetermined minimum duration, expressed by INIT. The decrement of the counter COMPT constitutes a countdown, which is reset upon each detection of a manipulation. The manipulation is considered to have ended (which is expressed by the return of the flag MANIP to zero) when no detection—whether "initial" or "subsequent"—occurs for said predetermined duration.

Figure 4:
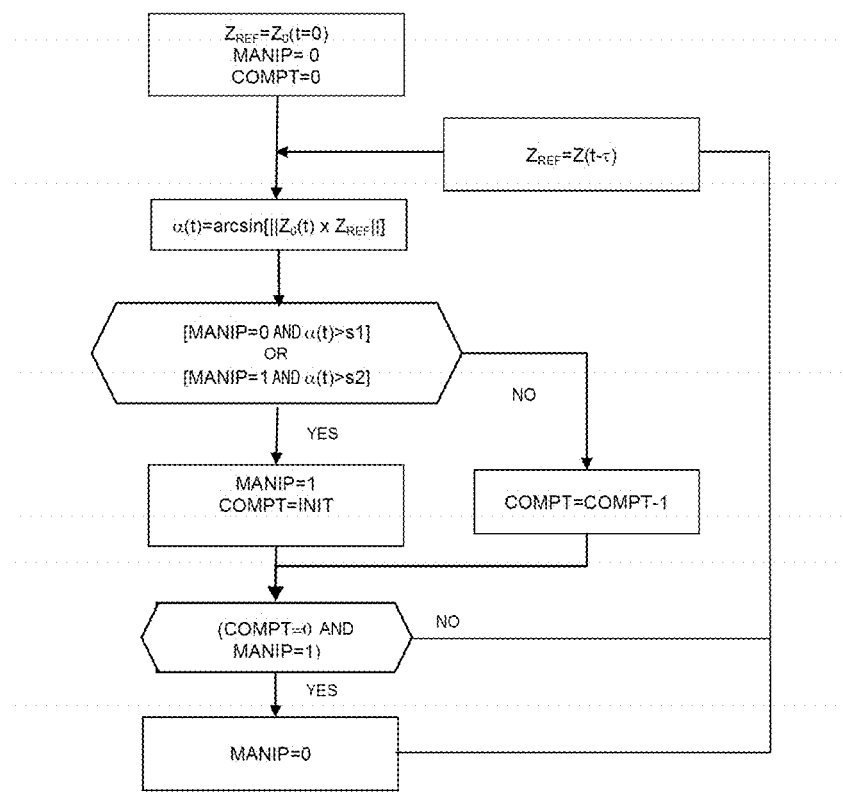
FIG. 4, a flowchart of a method according to a second embodiment of the invention.

According to another embodiment, shown in the flowchart of FIG. 4:

If a manipulation is detected (whether it is an "initial detection", where the first threshold s1 is crossed, or a "subsequent detection", where the second threshold s2 is crossed):

the flag MANIP changes to 1, to indicate that a manipulation is in progress;
the reference direction $Z_{REF}$ is updated, and takes the value of $Z_0$ at a prior instant "t–τ", $Z_0(t-\tau)$;
the counter COMPT takes a predefined value INIT that corresponds to a predetermined duration, generally of the order of 1 second.

If no manipulation is detected:
the counter COMPT is decremented by one unit (assuming that it is not zero), and
the reference direction $Z_{REF}$ is updated, and takes the value of $Z_0$ at a prior instant "t–τ", $Z_0(t-\tau)$.

It is noted that according to this embodiment, the reference direction is always updated to the value of $Z_0$ at a prior instant, and this happens upon each iteration, regardless of whether a manipulation is detected. Preferably, the reference value is chosen so as to be equal to the value of $Z_0$ at instant t–τ, i.e. offset by timeshift τ, the latter most frequently being between 0.5 and 5 seconds, and typically of the order of one second. This timeshift may be parameterizable and experimentally adjusted.

Experience shows that this embodiment is more robust (fewer false positives), but less sensitive. Specifically, in order for a manipulation to be detected, it is necessary for the angular variation to take place in the time interval τ.

Numerous modifications of this method may be envisaged without departing from the scope of the present invention. By way of non-limiting example:

it is possible for the reference direction at an instant "t" not to be strictly equal to the vertical direction measured at a prior instant "t–τ", but, in any case, it must be calculated according to ("to match") at least one such prior vertical direction;

the accelerometer AM may be replaced with another sensor, e.g. a magnetometer that is sensitive to the earth's magnetic field—but this would entail additional complexity;

it would be possible to use only the threshold s1; in this case, the detection of the manipulations would be carried out by verifying the sole condition $\alpha(t) \geq 1$ and would be independent of the value of the flag;

in this case, it would be possible not to use flags, or a counter. These elements are nevertheless useful if it is desired to distinguish between a single manipulation that continues for a certain time and a succession of briefer manipulations;

the equation $\alpha(t) = \arcsin(\|Z_{REF} \times Z_0(t)\|)$ is only one possible method for determining the angle $\alpha(t)$;

the values of the thresholds s1 and s2, of the cutoff frequency, of the sampling frequency, of the mean spacing between the instants at which the orientation of the vertical direction is determined and of the minimum duration of a manipulation are given solely by way of non-limiting example, and depend on the specific applications in question;

the invention is also applicable to mobile devices other than mobile phones or touchscreen tablets.

The invention claimed is:

1. A method for detecting a manipulation of a mobile device, comprising the following steps:
   determining, by means of a sensor fixed to said mobile device, an orientation of a vertical direction in a reference frame tied to said mobile device at a plurality of successive instants;
   calculating, for each instant, an angle formed by the orientation of said vertical direction in said reference frame at each instant and a reference orientation corresponding to the vertical direction at a prior instant, wherein said reference orientation is chosen so as to be equal to the orientation of said vertical direction at a prior instant that precedes each instant by a duration τ of between 0.5 and 5 seconds; and
   detecting a manipulation when said angle exceeds a first threshold.

2. The method of claim 1, wherein said sensor is a three-axis accelerometer.

3. The method of claim 1, wherein the orientation is determined by a low-pass filtering operation on a signal generated by said sensor.

4. The method of claim 3, wherein said low-pass filtering operation is implemented with a cutoff frequency that is lower than or equal to 1 Hz.

5. The method of claim 1, wherein the plurality of successive instants are spaced apart by a mean interval of between 1 second and 1 millisecond.

6. The method of claim 1, wherein said first threshold is between 15° and 45°.

7. The method of claim 1, wherein said mobile device is a mobile phone or a touchscreen tablet.

8. An apparatus for detecting a manipulation of a mobile device, comprising:
   a sensor, fixed to said mobile device, configured to determine an orientation of a vertical direction in a reference frame tied to said mobile device at a plurality of successive instants;
   a processor connected to said sensor;
   the processor configured to calculate, for each instant, an angle formed by the orientation of said vertical direction in said reference frame at each instant and a reference orientation corresponding to the vertical direction at a prior instant, wherein said reference orientation is chosen so as to be equal to the orientation of said vertical direction at a prior instant that precedes each instant by a duration τ of between 0.5 and 5 seconds; and
   the processor further configured to detect a manipulation when said angle exceeds a first threshold.

9. The apparatus of claim 8, wherein said sensor is a three-axis accelerometer.

10. The apparatus of claim 8, wherein the orientation is determined by a low-pass filtering operation on a signal generated by said sensor.

11. The apparatus of claim 10, wherein said low-pass filtering operation is implemented with a cutoff frequency that is lower than or equal to 1 Hz.

12. The apparatus of claim 8, wherein the plurality of successive instants are spaced apart by a mean interval of between 1 second and 1 millisecond.

13. The apparatus of claim 8, wherein said first threshold is between 15° and 45°.

14. The apparatus of claim 8, wherein said mobile device is a mobile phone or a touchscreen tablet.

15. A mobile phone comprising an apparatus for detecting a manipulation, comprising:
- a sensor, fixed to said mobile phone, configured to determine an orientation of a vertical direction in a reference frame tied to said mobile phone at a plurality of successive instants;
- a processor connected to said sensor;
- the processor configured to calculate, for each instant, an angle formed by the orientation of said vertical direction in said reference frame at each instant and a reference orientation corresponding to the vertical direction at a prior instant, wherein said reference orientation is chosen so as to be equal to the orientation of said vertical direction at a prior instant that precedes each instant by a duration τ of between 0.5 and 5 seconds; and
- the processor further configured to detect a manipulation when said angle exceeds a first threshold.

16. A touchscreen tablet comprising an apparatus for detecting a manipulation, comprising:
- a sensor, fixed to said touchscreen tablet, configured to determine an orientation of a vertical direction in a reference frame tied to said touchscreen tablet at a plurality of successive instants;
- a processor connected to said sensor;
- the processor configured to calculate, for each instant, an angle formed by the orientation of said vertical direction in said reference frame at each instant and a reference orientation corresponding to the vertical direction at a prior instant, wherein said reference orientation is chosen so as to be equal to the orientation of said vertical direction at a prior instant that precedes each instant by a duration τ of between 0.5 and 5 seconds; and
- the processor further configured to detect a manipulation when said angle exceeds a first threshold.

\* \* \* \* \*